US012752500B2

(12) United States Patent
Weisenberg

(10) Patent No.: US 12,752,500 B2
(45) Date of Patent: Oct. 6, 2026

(54) AXIAL REINFORCEMENT FILAMENT APPLICATION METHODOLOGY

(71) Applicant: Safeguard LLC, Jacksonville, FL (US)

(72) Inventor: Kent Weisenberg, Jacksonville, FL (US)

(73) Assignee: Safeguard LLC, Jacksonville, FL (US)

( * ) Notice: Subject to any disclaimer, the term of this patent is extended or adjusted under 35 U.S.C. 154(b) by 0 days.

(21) Appl. No.: 18/235,454

(22) Filed: Aug. 18, 2023

(65) Prior Publication Data

US 2024/0059033 A1 Feb. 22, 2024

Related U.S. Application Data

(60) Provisional application No. 63/399,037, filed on Aug. 18, 2022.

(51) Int. Cl.

| | |
|---|---|
| ***B29C 70/50*** | (2006.01) |
| ***B29C 63/04*** | (2006.01) |
| ***B29C 70/38*** | (2006.01) |
| ***B29C 70/54*** | (2006.01) |
| *B29L 23/00* | (2006.01) |

(52) U.S. Cl.

CPC .............. *B29C 70/50* (2013.01); *B29C 70/38* (2013.01); *B29C 70/545* (2013.01); *B29L 2023/22* (2013.01)

(58) Field of Classification Search

CPC ....... B29C 63/12; B29C 53/805; B29C 63/10; B29C 53/68; B29C 53/60; B29C 70/526; B29C 70/50

See application file for complete search history.

(56) References Cited

U.S. PATENT DOCUMENTS

| | | | | |
|---|---|---|---|---|
| 2,756,458 A * | 7/1956 | Krupp | B29C 53/50 | 425/467 |
| 3,328,224 A * | 6/1967 | Aylor | B29C 70/16 | 156/461 |
| 3,656,513 A * | 4/1972 | Evans | B29C 66/83411 | 156/244.18 |
| 4,689,003 A * | 8/1987 | Schreiner | B29C 33/68 | 156/173 |
| 6,775,910 B1 * | 8/2004 | Coffey | B26D 1/035 | 492/38 |
| 2019/0063642 A1 * | 2/2019 | Ehsani | B29C 70/386 | |

FOREIGN PATENT DOCUMENTS

| | | | | |
|---|---|---|---|---|
| JP | H0524042 | * | 2/1993 | B29B 11/16 |

* cited by examiner

*Primary Examiner* — Matthew J Daniels
(74) *Attorney, Agent, or Firm* — TROUTMAN PEPPER LOCKE LLP; Dustin B. Weeks

(57) ABSTRACT

The disclosed concept relates generally to a tubular composite structure for the intake, storage, and conveyance of gaseous or liquid media, including but not limited to hydrogen, hydrocarbons, and non-hydrocarbons, and related methods for manufacture. The tubular composite structure consists of one or more cannular assemblies, each composed of multiple layers of sealing, reinforcement, sensing and monitoring components, pressure injected fluids, and overmolded structural and protection layers.

29 Claims, 8 Drawing Sheets

AXIAL REINFORCEMENT FILAMENT APPLICATION METHODOLOGY

CROSS-REFERENCE TO RELATED APPLICATIONS

This application claims priority to U.S. Provisional Patent Application No. 63/399,037, filed 18 Aug. 2022, the contents of which are incorporated herein by reference in its entirety.

FIELD OF THE INVENTION

The disclosed concept relates generally to a tubular composite structure for the intake, storage, and conveyance of gaseous or liquid media, including but not limited to hydrogen, hydrocarbons, and non-hydrocarbons, and related methods for manufacture. The tubular composite structure consists of one or more cannular assemblies, each composed of multiple layers of sealing, reinforcement, sensing and monitoring components, pressure injected fluids, and over-molded structural and protection layers.

BACKGROUND OF THE INVENTION

Certain flexible composite liners are currently in use both for gaseous pipelines and pipeline rehabilitation. Typically, these liners are prefabricated in a straight orientation and are spooled post-fabrication for transport to the jobsite on spools or by connecting pre-manufactured or 'off the shelf' pipe sections and reinforcing them in a straight-line orientation. This manufacture process leads to deficiencies, both in the diameter of the liner (generally limited to 16 inches or smaller), and in the requirement to introduce curvature post-fabrication which imposes limitations on the pressure that can be accommodated. In contrast, tubular composite structures disclosed herein are manufactured on-site, obviating the limitations imposed by transportation. These tubular composite structures can have a larger diameter, due to their onsite manufacture, unconstrained by transport restrictions. Furthermore, intrinsic curvature can be introduced into these tubular composite structures during on-site manufacture, which affords stronger tubes than can be obtained by bending or deforming a straight tube into a curved shape.

Multilayer tubular composite structures are suitable for use as gaseous pipelines or to remediate and or repurpose existing pipelines. Media contained within the tubular composite structure may consist of commercially or industrial important gases and liquids, including but not limited to hydrogen, hydrocarbon, and non-hydrocarbon. The tubular composite structure may be particularly valuable for gases and liquids relevant to renewable energy sources, including hydrogen, natural gas, natural gas/hydrogen mixtures, renewable natural gas, ammonia, and carbon dioxide. The media may be at ambient pressure or may be pressurized. The structure can be positioned either above ground, sub-terra, or sub-terra with multiple tiers of individual coils, and can be located at end-user industrial facilities such as hydrogen production facilities terminals, power plants, mining operations or data centers. The structure can be installed expeditiously and with materials and methodologies that afford a meaningful reduction in carbon emissions over existing technologies.

The tubular composite structure consists of one or more cannular assemblies disclosed herein, each composed of multiple concentric layers of sealing, reinforcement, sensing and monitoring components, pressure injected fluids, and over-molded structural and protection layers. The cannular assemblies are manufactured individually. In the case of two or more cannular assemblies in a single tubular composite structure, the first cannular assembly will form the exterior of the tubular composite structure, with each successive cannular assembly inserted in the interior of the tubular composite structure and pushed and/or pulled into place into the one or more existing, fully manufactured, cannular assemblies.

Each of the one or more cannular assemblies may be manufactured with the use of a cantilevered forming mandrel. The mandrel is designed so that a cannular assembly can be manufactured by applying the various cylindrical layers in sequence. Manufacture is initiated at the supported, or upstream, end of the mandrel with formation of the leading end of an innermost cylindrical layer, which envelops the mandrel. The leading end is then advanced down the mandrel, pulling the innermost layer, representing the growing cannular assembly, behind it. Various stations are located along the length of the mandrel, exterior to both the mandrel and the cannular assembly. At each station, a cylindrical layer is formed on the exterior of the existing layer which is outermost at that station. At each station, the newly formed cylindrical layer then becomes the outermost layer of the growing structure. The finished end of the cannular assembly is then dismounted from the mandrel at the unsupported, or downstream, end.

Also provided herein is a mobile onsite factory ("MOF"), containing machinery for manufacturing a tubular composite structure. The MOF can be located directly to a site, thus circumventing problems that might arise with transportation or storage of prefabricated tubular composite structures. The MOF generally is elongated in one dimension, to accommodate a forming mandrel within. The height and width of the MOF are generally constrained by requirements determined by the mode of transportation. In some embodiments, the structure is appointed to its site as it is being manufactured, with the growing structure being directed to its destination.

The MOF generally contains an axial layer station, for application of reinforcement material in the axial direction, i.e., parallel to the centerline of the cannular assembly. An axial layer station contains one or more applicators oriented generally around the circumferences of both the mandrel and the nascent cannular assembly. Each of the one or more applicators applies a strip of material to an arc of the circumference or, in the case of a single applicator, to the entire circumference. In this way, the one or more of applicators ensures that the entirety of the surface of the cannular assembly is covered with material.

In some embodiments, each of the one or more applicators comprises a first roller oriented perpendicular to the mandrel axis. The first roller can be substantially cylindrical in shape, or alternatively can adopt an inward or outward curve. For each applicator, axial reinforcement material can be supplied as a strip, optionally oriented parallel to the mandrel axis. The strip can contact the external circumference of the first roller associated with the applicator, and thereby be redirected inwards to the surface of the nascent TCS. The first roller can be equipped with a tensioning mechanism which can provide uniform tension.

In some further embodiments, each of the one or more applicators further comprises a second roller perpendicular to the mandrel axis. The second roller can be substantially cylindrical in shape, or alternatively can adopt an inward curve. For each applicator, axial reinforcement material can pass from the exterior circumference of the first roller to the interior circumference of the second roller, and thereby be redirected in a direction more nearly parallel to the surface of the nascent TCS. The second roller can be equipped with a tensioning mechanism which can provide uniform tension. Alternatively, the second roller can be held in proximity to the surface of the nascent TCS. In this configuration, the axial reinforcement material emerges from the second roller substantially parallel to the mandrel axis.

In some embodiments, the second roller is held against the surface of the nascent TCS. In some embodiments, the second roller adopts an inward curve that substantially matches an arc of the circumference of the nascent TCS. In this configuration, when the second roller is thus oriented, the axial reinforcement material is substantially in contact with both the roller and the surface of the nascent TCS.

Each of the one or more of applicators can be equipped with a dedicated supply of material, optionally in the form of a spool. For mechanical simplicity, each spool can be located in proximity to the corresponding applicator, resulting in a toroidal orientation of spools around the circumference. In some embodiments, the station can contain two or more such sets of spools, located at different lateral positions along the mandrel.

Axial layer stations that contain one or more toroids of spools surrounding the mandrel is not optimal, for at least the following reasons. The structural constraints of the MOF impose an upper limit on the size, and therefore capacity, of the individual spools, resulting in frequent production stops for swapping in fresh spools of material. The width of the individual strips of material, and therefore the width of the spools, can be reduced by increasing the number of applicators; however, this modification will not only increase mechanical complexity, but will also increase the number of splices required between adjacent strips of material, which may in turn negatively impact the strength or integrity of the axial layer.

It will be appreciated that this toroid of spools negatively impacts the options for transporting the MOF: even if the remainder of the vehicle is relatively narrow and compact, the toroid may represent a bulge in the cross-sectional dimensions that precludes certain modes of transportation.

An improved design for the applicators for the axial reinforcement layer is therefore needed.

SUMMARY OF THE INVENTION

These needs, and others, are met by an alternate design of the axial layer station, which departs from the toroidal arrangement of spools. This design will facilitate alternate arrangements of the spools which do not require the toroid of spools at a single lateral position along the MOF. Alternate arrangements of the one or more spools can improve on the dimensions of the MOF and/or provide larger storage capacity within the same dimensions.

In an exemplary embodiment, the MOF contains one or more spools suitable for providing axial reinforcement material, wherein none of the one or more spools is located at the same lateral position along the MOF as the axial layer station. In a further embodiment, at least two of the one or more spools are staggered along the length of the mandrel relative to each other.

In an exemplary embodiment, all of the one or more spools are located at a location in the MOF upstream from the mandrel. Such a location will provide more total volume and flexibility in arranging spools and associated machinery, due to the absence of the mandrel in that section of the MOF.

In an exemplary embodiment, at least one of the one or more spools provides axial reinforcement material for a plurality of axial applicators. In a further embodiment, each of the one or more spools provides axial reinforcement material for a plurality of axial applicators.

In a still further embodiment, the MOF contains a single spool of axial reinforcement material located at a different lateral position along the MOF than the axial layer station. In a yet further embodiment, the single spool provides axial reinforcement material for a plurality of applicators.

In one embodiment, the single spool is located in proximity to the axial layer station. Preferably, the single spool is located at a remote location in the MOF, due to the space constraints around the mandrel. In one embodiment, the single spool will be located at a location upstream from the mandrel, in order to be completely unencumbered by the space requirements of the mandrel.

The single spool may be powered by a motor, in order to provide axial reinforcement material to the plurality of axial applicators. Alternatively, the single spool may be mounted on a freely rotating bearing, so that tension in the cannular assembly pulls axial reinforcement material off the spool.

In some embodiments, the MOF further contains a mechanism for laterally splitting axial reinforcement material from a spool of said material, thereby facilitating the supply of more than one axial applicator by the spool.

In an exemplary embodiment, the MOF contains a plurality of spools suitable for providing axial reinforcement material, wherein none of the one or more spools is located at the same lateral position along the MOF as the axial layer station. In some embodiments, at least two of the plurality of spools are located in the MOF with parallel axes. In some embodiments, at least two of the plurality of spools are located in the MOF with collinear axes. In some embodiments, the axes of the plurality of spools are parallel. In some embodiments, the axes of the plurality of spools are collinear. In some embodiments, the axis of at least one of the plurality of spools is oriented perpendicular to the mandrel axis. In some embodiments, the axes of each of the plurality of spools are oriented perpendicular to the mandrel axis. In some embodiments, the axes of at least two, optionally at least three, optionally at least four of the plurality of spools are coplanar. In some embodiments, the axes of at least two, optionally at least three, optionally at least four of the plurality of spools are coplanar to a plane perpendicular to the mandrel axis. In some embodiments, the axis of each spool is coplanar with the axis of at least one other spool, optionally with the axes of at least two other spools, optionally with the axis of at least three other spools.

Each of the plurality of spools may be powered by a motor, in order to provide axial reinforcement material, optionally at differing rates, to the plurality of axial applicators. Alternatively, a single motor may drive in unison the plurality of spools, thereby providing a uniform rate of delivery of axial reinforcement material to the plurality of axial applicators. Alternatively, each of the plurality of spools may be mounted on a freely rotating bearing, so that tension in the cannular assembly pulls axial reinforcement material off the spool.

The following benefits can be realized: Each applicator can be simpler and more compact, freed from the requirement of a spool in close proximity to the applicator, the mandrel, and the neighboring applicators. Since each applicator can be more compact, and since individual spools need not be positioned adjacent to each applicator, a smaller number of applicators, each covering a larger arc of the circumference, can be utilized, thereby decreasing the number of strips of material and resulting number of splices.

Accordingly, provided herein is a mobile onsite factory ("MOF"), containing:

- a forming mandrel;
- an axial layer station for application of axial reinforcement material on a nascent cannular assembly, the station containing one or more applicators; and
- one or more spools suitable for providing axial reinforcement material to the one or more applicators;
- wherein at least one of the one or more spools is located at a different lateral position along the mandrel than the axial layer station.

Also provided herein is a mobile onsite factory ("MOF"), containing:

- a forming mandrel;
- an axial layer station for application of axial reinforcement material on a nascent cannular assembly, the station containing one or more applicators; and
- a single spool suitable for providing axial reinforcement material to the one or more applicators;
- wherein the single spool is located in the MOF upstream of the supported end of the mandrel.

Also provided herein is a mobile onsite factory ("MOF"), containing:

- a forming mandrel;
- an axial layer station for application of axial reinforcement material on a nascent cannular assembly, the station containing a plurality applicators; and
- a plurality of spools suitable for providing axial reinforcement material to the plurality applicators;
- each of the plurality of spools of provides axial reinforcement material to an individual applicator;
- wherein the plurality of spools is located in the MOF upstream of the supported end of the mandrel.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

Figure 1:
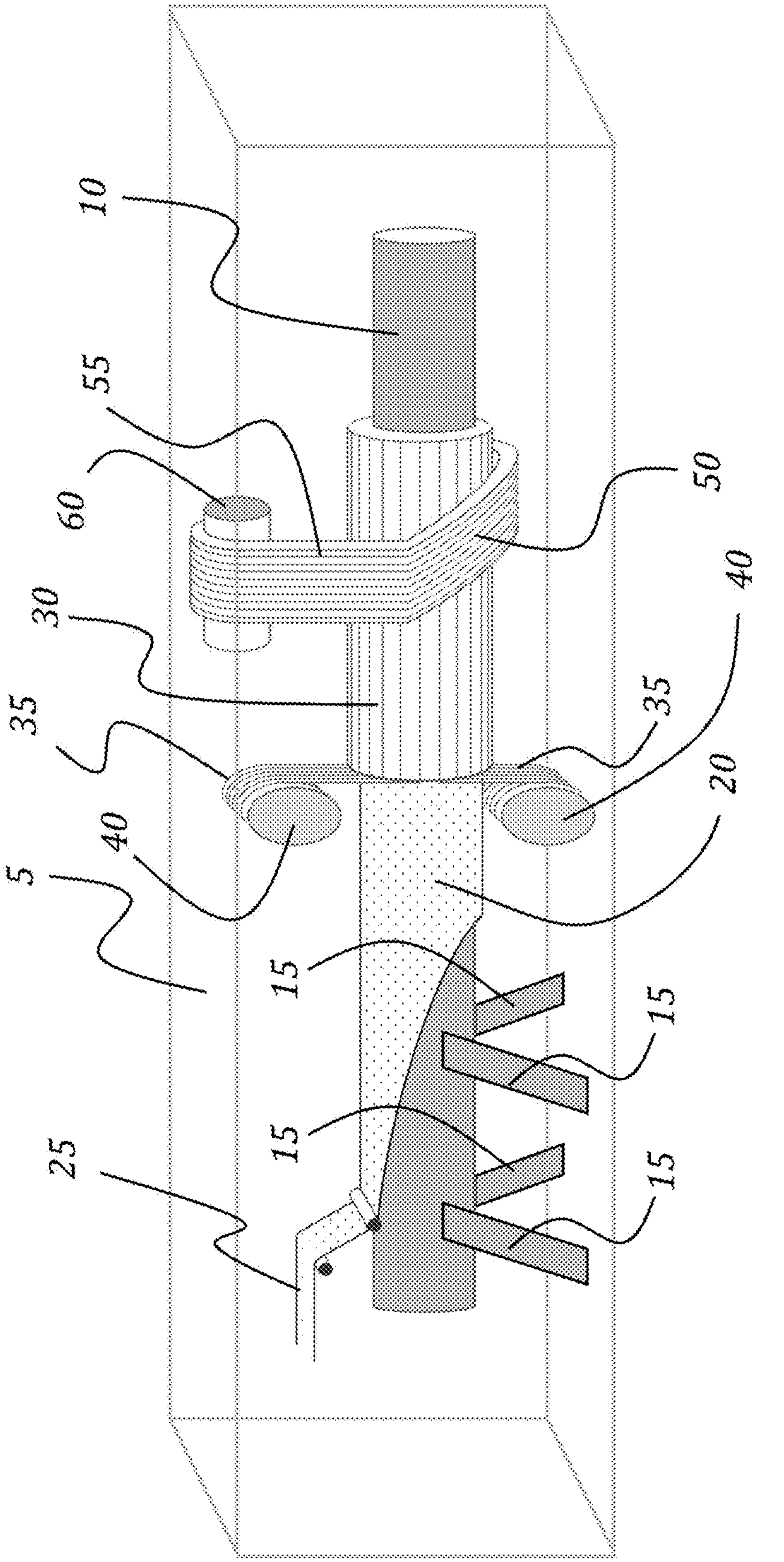
FIG. 1 depicts a schematic of a MOF that employs a source of axial reinforcement material adjacent to the applicators.

Provided herein is a mobile onsite factory ("MOF"), containing:

- a forming mandrel;
- an axial layer station for application of axial reinforcement material on a nascent cannular assembly, the station containing one or more applicators; and
- one or more spools suitable for providing axial reinforcement material to the one or more applicators;
- wherein at least one of the one or more spools is located at a different lateral position along the mandrel than the axial layer station.

In some embodiments, each of the one or more spools is located at a different lateral position along the mandrel than the axial layer station.

In some embodiments, the one or more spools are located upstream of the supported end of the mandrel.

In some embodiments, the one or more spools is located in the MOF upstream of the supported end of the mandrel.

In some embodiments, at least one of the one or more spools provides axial reinforcement material for a plurality of axial applicators. In some embodiments, each of the one or more spools provides axial reinforcement material for a plurality of axial applicators.

Also provided herein is a mobile onsite factory ("MOF"), containing:

- a forming mandrel;
- an axial layer station for application of axial reinforcement material on a nascent cannular assembly, the station containing one or more applicators; and
- a single spool suitable for providing axial reinforcement material to the one or more applicators;
- wherein the single spool is located in the MOF upstream of the supported end of the mandrel.

In some embodiments, the single spool is located in the MOF upstream of the supported end of the mandrel. In some embodiments, the single spool provides axial reinforcement material for the one or more axial applicators.

In some embodiments, the MOF further contains a motor for driving the single spool. In some embodiments, the MOF further contains a capstan or roller to modulate tension in the axial reinforcement material from the single spool.

Also provided herein is a mobile onsite factory ("MOF"), containing:

- a forming mandrel;
- an axial layer station for application of axial reinforcement material on a nascent cannular assembly, the station containing one or more applicators; and
- a plurality of spools suitable for providing axial reinforcement material to the one or more applicators.

In some embodiments, the MOF contains a plurality of spools suitable for providing axial reinforcement material to the one or more applicators. In some embodiments, at least two of the plurality of spools are located at different lateral positions along the mandrel. In some embodiments, each of the plurality of spools is located at a different lateral position along the mandrel. In some embodiments, the plurality of spools is located in the MOF upstream of the supported end of the mandrel.

In some embodiments, at least two of the plurality of spools are located in the MOF with parallel axes. In some embodiments, the plurality of spools is located in the MOF with parallel axes. In some embodiments, at least two of the plurality of spools are located in the MOF with collinear axes. In some embodiments, the plurality of spools is located in the MOF with collinear axes. In some embodiments, each of the plurality of spools of provides axial reinforcement material to an individual applicator.

In some embodiments, the MOF further contains one or more motors for driving each of the plurality of spools. In some embodiments, the MOF further contains a single motor for driving in unison the plurality of spools.

In some embodiments, the MOF further contains a capstan or roller for at least one of the plurality of spools, to modulate tension in the axial reinforcement material from the spool. In some embodiments, the MOF further contains a capstan or roller for each of a plurality of spools, to modulate tension in the axial reinforcement material from for each of the spools.

In some embodiments, the axial layer station contains a plurality of applicators. In some embodiments, each of the plurality of applicators is fed by a different spool.

In some embodiments, at least two, optionally at least three, optionally at least four of the plurality of applicators are substantially coplanar with a plane perpendicular to the mandrel axis. In some embodiments, each applicator is coplanar with at least one other applicator, optionally at least two other applicators, optionally at least three other applicators. In some embodiments, the plurality of applicators encircles the entirety of the MOF.

In some embodiments, the MOF further contains a mechanism for laterally splitting axial reinforcement material from a spool of said material, thereby facilitating the supply of more than one axial applicator by the spool.

In some embodiments, the axial reinforcement material is chosen from para-aramid fiber, unidirectional fiberglass, carbon fiber, Kevlar, or HDPE fabric. In some embodiments, the axial reinforcement material is pre-impregnated with a further material chosen from epoxy, polyurethane, polyolefin, and EVA. In some embodiments, the axial reinforcement material comprises twisted or braided micro-ropes or twisted or braided carbon fiber graphene hybrid micro-ropes which are optionally impregnated with EVA.

In some embodiments, the MOF further contains an sealing layer station for application of a sealing layer. In some embodiments, the sealing layer is made from a sealing material chosen from ABS, PE, HDPE, UHMWPE, Nylon, PEEK, PET, PSS, PDA, PLA, PLLA, PPL, ETFE, polycarbonate, and polyurethane.

In some embodiments, the MOF further contains at least one station for application of a hoop reinforcement layer, the at least one station each comprising one or more applicators. In some embodiments, the hoop reinforcement layer is made from a hoop reinforcement material chosen from para-aramid fiber, unidirectional fiberglass, carbon fiber, Kevlar, or HDPE fabric. In some embodiments, the hoop reinforcement material is pre-impregnated with a further material chosen from epoxy, polyurethane, polyolefin, and EVA. In some embodiments, the hoop reinforcement material comprises twisted or braided micro-ropes or twisted or braided carbon fiber graphene hybrid micro-ropes. In some embodiments, the hoop reinforcement material further comprises a Pd-coated tapered optical fiber.

In some embodiments, the MOF further contains a station for application of a sensor array layer.

In some embodiments, the MOF further contains a station for the formation of a mesh-filled annulus.

In some embodiments, the MOF further contains a station for the formation of a protective layer. In some embodiments, the protective layer is a protective over-mold.

Abbreviations

ABS=acrylonitrile butadiene styrene plastic; AMV=Autonomous Manufacturing Vehicle; ETFE=Ethylene tetrafluoroethylene; ID=inner diameter=inside diameter; MIG=metal inert gas welding; MOF=mobile onsite factory; OD=outer diameter=outside diameter; PDA=poly(diacetylene); PE=polyethylene; UHMWPE=ultra high molecular weight polyethylene; HDPE=high density polyethylene; LDPE=low density polyethylene; PEEK=Polyether ether ketone; PLA=poly(lactic acid); PLLA=poly(L-lactic acid); PPL=poly(polypropiolactone); PSS=poly(styrene sulfonate); SMAW=shielded metal arc welding; TCS=cannular composite structure; TDC=track drive carrier; TIG=tungsten inert gas welding; UHMWPE=Ultrahigh-molecular-weight polyethylene; UT=ultrasonic.

Definitions

The term “annulus”, as used herein, alone or in combination, refers to a region between two concentric circles. The term “annular cylinder”, as used herein, alone or in combination, refers to a reuion between two concentric cylinders. The term “interspatial annular cylinder”, as used herein, alone or in combination, refers to an empty region between two concentric cylinders. In some embodiments, the interspatial annular cylinder can be filled with a liquid. In some embodiments, the liquid within an interspatial annular cylinder can then be cured, to form a solid, gel, or semi-solid.

The term “axial”, as used herein, alone or in combination, refers to the direction parallel to a tube or cylinder. For the case of a nonlinear or coiled tube or cylinder, the term refers to the direction at a point on the tube or cylinder that is parallel to the tube or cylinder at that point.

The term “concentric”, as used herein, alone or in combination, refers to two circular or cannular structures which share approximately the same center. The term “concentric” will also refer to two tubes which share approximately the same center, both of which tubes then form a coiled geometry.

The term “cylinder”, as used herein, refers to the standard geometric definition of a prism with a circle at its base. It will be appreciated that some of the articles of manufacture described herein may be susceptible to forces, e.g., gravity, which distort the ideal cylindrical shape. The term “cylinder”, as used herein, will also cover these articles of manufacture.

The term “cannular assembly”, as used herein, alone or in combination, refers to an assembly of concentric tubes. In some embodiments, a cannular assembly comprises, from innermost surface to outermost surface: (b) an axial reinforcement layer, and (c) one or more hoop reinforcement layers. In some embodiments, a cannular assembly comprises, from innermost surface to outermost surface: (a) a sealing layer, (b) an axial reinforcement layer, and (c) one or more hoop reinforcement layers. In some embodiments, a cannular assembly comprises, from innermost surface to outermost surface: (b) an axial reinforcement layer, (c) one or more hoop reinforcement layers, and (d) a protective layer. In some embodiments, a cannular assembly comprises, from innermost surface to outermost surface: (a) a sealing layer, (b) an axial reinforcement layer, (c) one or more hoop reinforcement layers, and (d) a protective layer. In some embodiments, a cannular assembly further comprises one or more sensor array layers. In some embodiments, the axial layer in a cannular assembly comprises a Pd- or Pd-alloy coated tapered optical fiber. In some embodiments, one or more hoop reinforcement layers in a cannular assembly comprises a Pd- or Pd-alloy coated tapered optical fiber.

The term "downstream", as used herein, refers to a direction along the mandrel away from the supported end and towards the unsupported end. The term "downstream" may also be used for a location that is outside the length of the mandrel on the side of the unsupported end of the mandrel. The term "upstream", as used herein, refers to a direction along the mandrel away from the unsupported end of the mandrel and towards the supported end. The term "upstream" may also be used for a location that is outside the length of the mandrel on the side of the supported end of the mandrel.

The term "tubular composite structure" ("TCS"), as used herein, alone or in combination, refers to a structure containing one or more concentric cannular assemblies. In some embodiments, the TCS contains 1, 2, 3, 4, or 5 concentric cannular assemblies. The cannular assemblies may be the same or different. In some embodiments, the tubular composite structure comprises one or more interspatial annular cylinders between adjacent cannular assemblies.

The term "innervated tubular composite" ("ITC"), as used herein, alone or in combination, refers to a tubular composite structure contains one or more sensor array layers or one or more sensor wires. In some embodiments, the ITC contains one or more sensor array layers and one or more sensor wires. The ITC is therefore can provide telemetry on its condition to the user. In some embodiments, the ITC can report conditions chosen from structural integrity, internal pressure, presence of leaks, and extent of leakage.

The term "forming mandrel" or "mandrel", as used herein, refers to a horizontally oriented tube that is cantilevered, i.e., directly supported at only one end. The mandrel is manufactured so that a hoop or cylinder enclosing the mandrel at the supported end can pass down the length of the mandrel unobstructed to the unsupported end. A mandrel can be optionally solid, but is preferentially hollow. A mandrel can consist of a single monolithic structure. Alternatively, a mandrel can be composed of segments, one or more of which can optionally be translated and/or rotated relative to adjacent segments. A mandrel can be linear, or can assume a non-linear geometry. A mandrel composed of multiple segments can be articulated either actively, by powered drives located in the mandrel, or passively, via contact forces applied to the exterior of the mandrel.

The term "intrinsic curvature", as used herein, alone or in combination, refers to an article of manufacture which, in the absence of external force, assumes a curved geometry. The term is therefore intended to include an article of manufacture whose manufacture comprised a step of introducing curvature concurrent with manufacture. The term is therefore intended to exclude an article of manufacture whose manufacture comprises a step of introducing curvature into a non-curved precursor of the article. The term is also therefore intended to exclude an article of manufacture whose manufacture comprises a step of increasing the curvature, i.e., decreasing the radius of curvature, into a less-curved precursor of the article (i.e., having a larger radius of curvature).

The terms "pitch", "roll", and "yaw", as used herein, have their standard meanings as used, for example, in aviation. The direction of an advancing growing cannular assembly on the mandrel is considered as the forward direction.

The term "radius of curvature", as used herein, alone or in combination, refers to the radius of a circle whose curvature best approximates the curvature at a particular location on an arc.

The term "wire", as used herein, alone or in combination, refers to a means for transmitting either information or electrical current over distance. The term therefore encompasses traditional wire based on copper, aluminum, or other conducting metal. The term therefore also encompasses fibers for the transmission of information without electrical current, and thus encompasses optical fibers.

Forming Mandrel

Also provided herein, in an exemplary embodiment, is a cantilevered forming mandrel for the manufacture of a tubular composite structure.

In some embodiments, the mandrel is monolithic. In some embodiments, the mandrel comprises a plurality of segments positioned successively from the supported, upstream end to the unsupported, downstream end. In some embodiments, the segments are substantially cylindrical in shape.

In some embodiments, the mandrel is substantially linear. In some embodiments, the mandrel is substantially curved. In some embodiments, the curvature of the mandrel can be varied. In some embodiments, the mandrel can be varied between curved geometries of different radii of curvature. In some embodiments, the mandrel can be varied between curved geometries of different radii of curvature during manufacture of the cannular assembly. In some embodiments, the mandrel can be varied between linear and curved.

In some embodiments, the exterior of the mandrel is substantially cylindrical in shape. In some embodiments, the exterior of the mandrel is substantially the shape of a toroidal segment.

In some embodiments, the mandrel is solid or, alternatively, is composed of solid segments.

In some embodiments, the mandrel is hollow or, alternatively, is composed of hollow segments.

In some embodiments, one or more pairs of adjacent segments in a segmented mandrel is connected with hinges. In further embodiments, all pairs of adjacent segments are connected with hinges.

In some embodiments, the hinges allow the individual segments in each pair of adjacent segments to translate and/or rotate relative to each other. In some embodiments, the hinges allow the individual segments in each pair of adjacent segments to translate and/or rotate relative to each other in the horizontal plane. In some embodiments, the hinges allow the individual segments in each pair of adjacent segments to rotate relative to each other in the horizontal plane.

In some embodiments, one or more pairs of the adjacent segments that are connected with hinges are further fitted with machinery to drive the translation and or rotational motion.

In some embodiments, all of the pairs of adjacent segments that are connected with hinges are further fitted with machinery to drive the translation and/or rotational motion.

In some embodiments, none of the pairs of adjacent segments that are connected with hinges are further fitted with machinery to drive the translation and/or rotational motion.

The dimensions of the mandrel will be determined by the nature of the tubular composite structure to be manufactured. The OD of the mandrel is the same or approximately the same as the desired ID of the tubular composite structure to be manufactured. Preferably, the OD of the mandrel can be adjusted to suit the on the required design of the cannular assembly. The length of the mandrel is determined by the number and size of the various stations, which in turn is determined by the makeup of the tubular composite structure.

Mobile Onsite Factory ("MOF")

Also provided herein is a mobile onsite factory ("MOF"), comprising machinery for manufacturing a cannular assembly. The MOF contains the forming mandrel and the stations exterior to the mandrel for the manufacture of the various layers of the structure. The MOF can be towed or, alternatively, self-propelled and powered by hydrogen, battery, hydrogen/battery, or traditional fuels. In some embodiments, the structure is appointed to its site as it is being manufactured, with the growing structure being directed to its destination.

AMV

Also provided herein is a variation of the MOF, termed autonomous manufacturing vehicle ("AMV"). The AMV uses an articulated design, with individual segments that can rotate and/or translate relative to each other. In some embodiments, the AMV contains a plurality of independently pivoting segments, each of which corresponds to a segment of a segmented mandrel, and on each of which a single station for manufacture of a single layer of the tubular composite structure can be mounted.

Sealing Layer

Manufacture of the cannular assembly begins with the fabrication of an innermost sealing layer. The sealing layer is a functional layer installed and located on the innermost surface of each cannular assembly. An aspect of the sealing layer is to serve as a cylindrical substrate for manufacture of the axial reinforcement layer described below. In preferred embodiments, the sealing layer can provide watertightness, and can act as a redundant leak safeguard and for increasing the buckling resistance in the final cohesive composite structure.

An advantage to the design of the tubular composite structure is that layers exterior to the sealing layer can accommodate mechanical stress on the tubular composite structure. For example, an optional hoop reinforcement layer exterior to the sealing layer can provide exterior reinforcement of the sealing layer. Due to the presence of this hoop reinforcement layer, outward strain applied to the sealing layer due to internal fluid or gas pressurization during service the sealing layer is completely constrained from causing separation, damage, or rupture by the hoop reinforcement layer. The sealing layer material is therefore only subjected to compression, to which it has a high resistance. This design parameter ensures that any short term, long-term or transient loading on the sealing layer material and the seam is far below the material's physical properties thus eliminating any potential for separation, creep, cracking or rupture as well as significantly mitigating long term material fatigue.

In an embodiment, manufacture of an individual cannular assembly proceeds down the mandrel, with the first step being formation of the sealing layer. Successive steps apply material to the exterior of the growing cannular assembly, except for optional spray application to the interior of the cannular assembly at the end of the mandrel.

The plastic sheet material for the sealing layer can be precut, and can be delivered to the jobsite on large spools for use as manufacturing feedstock. The sealing layer material is dispensed by feeding the material into a set of opposing compressive and dynamic rollers thus both pulling the feedstock from the spool and pushing the feedstock into the centering rollers (if required) or the shaper fixture.

In some embodiments, particularly if the feedstock material is of narrower width than the spool and is wound on the spool in a stepped side by side layered orientation it will enter a stationary centering mechanism prior to entering the shaper fixture. This mechanism utilizes a series of long steel cannular rollers situated in a serpentine orientation to center the material in line with the shaper fixture and mandrel if being pulled from the spool at an angle.

In some embodiments, particularly if the width of the feedstock material—and thus the circumference of the sealing layer—must be controlled to a high precision, the feedstock material will then progress through a trimmer/beveler mechanism. As the material progresses through the trimmer/beveler mechanism the outside edges of the material feedstock are mechanically trimmed to the exact width required for the radial measure of the sealing layer. This trimming process also incorporates a bevel or miter in the edge of the material of opposing angles on opposite edges. These opposing angles create a smooth mitered joint when the sealing layer is formed into a cannular structure and the seam is welded. By mitering the seam, the material overlaps itself thereby increasing the integrity of the weld.

In some embodiments, a shaper fixture, located downstream from the spools, the optional centering mechanism, and the optional trimmer/beveler, is employed. The concentric shaper fixture is a series of specifically oriented rollers and or structural segments oriented axially with a concentric and continuous reduction in radial aspect which compresses and subsequently forms the feedstock material into a cannular structure of the specified internal diameter as it progresses onto the forming mandrel with the seam miter now aligned and compressed for welding and overlay.

By way of the aforementioned components, the ribbonlike feedstock material for the sealing layer is manipulated into a cylindrical structure, preferably at the upstream end of the mandrel, with the two edges of the feedstock meeting at a longitudinal seam. The aligned and compressed seam is welded by fusion, UT, or thermal welding processes, depending on the sealing layer material composition and the thickness of the material.

Axial Reinforcement Layer

The axial reinforcement layer is a functional layer that imparts axial reinforcement and strength to the cannular assembly. Due to the presence of one or more axial reinforcement layers, the tubular composite structure can resist axial loading created by internal pressure. The one or more layers can provide sufficient axial strength for applications such as pull-in-place installations of the tubular composite structure.

Fabrication of the axial reinforcement layer proceeds subsequent to formation of the cylindrical sealing layer. As this layer moves downstream on the mandrel, a station exterior to the mandrel applies the axial reinforcement material to its exterior. Due to the downstream motion of the sealing layer, material applied from the station will be oriented in the axial direction, i.e., parallel to the centerline of the cannular assembly. In order to envelop the entire cannular assembly, its entire surface, at any point in its circumference, will be covered with axial reinforcement material, either as a single cylinder of material, or as a plurality of strips of material, each covering an arc of the circumference.

In some embodiments, each point on the surface of the cannular assembly is covered with material from at least one strip.

For applications that require watertightness, the entirety of an axial reinforcement layer can be made watertight. This can be accomplished by joining adjacent strips of material with butt joints; alternatively, adjacent strips may be sealed with an overlap.

In some embodiments, the axial reinforcement layer is not required to be watertight. In some embodiments, watertightness of the tubular composite structure is provided by the aforementioned sealing layer.

The axial reinforcement layers can be made of any material that provides the required reinforcement. Individual axial reinforcement layers on different cannular assemblies can be made from different materials. By way of example only, the material can be chosen from para-aramid fiber, unidirectional fiberglass, carbon fiber, Kevlar, or HDPE fabric with or without pre-impregnated materials, such as epoxy, polyurethane, polyolefin, and EVA.

In some embodiments, one or more of the axial reinforcement layers in a cannular assembly may incorporate a sensor wire disclosed below, including but not limited to a Pd- or Pd-alloy coated tapered optical fiber.

The axial reinforcement layer can be made of individual twisted or braided carbon fiber micro-ropes or twisted or braided carbon fiber graphene hybrid micro-ropes aligned sequentially into filaments and bonded to each other with EVA or similar resin. The micro-ropes can be fabricated out of carbon fiber tow or carbon fiber graphene materials from 5k to 600k which are twisted to a specific torsion and orientation to increase the alignment and the subsequent strength of the micro-rope and subsequently the filament by assuring each strand is subjected uniformly when under strain. These micro-rope filaments can be bonded together longitudinally with EVA resin to create a sheet fabric. These micro-rope filaments can be bonded together to form a filament or tape. This filament or tape can be uniformly distributed along the axis of the structure. The micro-ropes can comprise the EVA-impregnated material described above. The micro-ropes can be bonded together to form a filament or tape.

Due to its nature in resisting axial tension, the axial reinforcement material is substantially inelastic in the axial direction. In some embodiments, the material is also substantially inelastic in the direction normal to the axial direction. The manufacturing process will generally employ pre-fabricated axial reinforcement material. This material, particularly in the form of fabrics, filaments, and tapes, may be supplied on spools. The MOF may therefore be configured to accommodate one or more spools of material for provisioning the one or more applicators, and the manufacturing process may draw material for fabrication of the axial reinforcement layer from the one or more spools.

Despite its strength in the axial direction, in some circumstances regulation of tension in the feedstock of axial reinforcement material may be desirable. This may be provided with a motor that drives a single spool of axial reinforcement material, or drives in unison a plurality of spools of axial reinforcement material. Alternatively, each of a plurality of spools may be provided with an individual motor.

One or more capstans or rollers, preferably one for each spool of material, may be used to modulate the tension in the material, along with, or in place of, one or more motors driving the one or more spools. The roller may take the form of a dynamic roller system. This system can be driven by a controller which receives data from one or more encoders mounted circumferentially on the axial layer station, thereby maintaining proper tension. This may be particularly beneficial for manufacture of nonlinear cannular assemblies, for which the rate of consumption on various points of the circumference will necessarily be unequal, due to the intrinsic curvature.

Hoop Reinforcement Layer

In some embodiments, the cannular assembly further comprises one or more hoop reinforcement layers. The one or more layers are preferably exterior to the axial reinforcement layer, and are therefore applied downstream on the mandrel from the axial layer station.

The one or more hoop reinforcement layers of the tubular composite structure are functional reinforcement layers applied helically to encircle the axial reinforcement layer for providing high resistance to hoop stresses created in the tubular composite structure from internal pressure. This layer most typically will be made from twisted carbon fiber tow or twisted carbon fiber graphene hybrid (micro-ropes); however, unidirectional carbon fiber or glass fiber, Kevlar, aramid, preferably para-aramid, or polyethylene fibers can be used as an iteration of this embodiment. The hoop reinforcement layer is wound over the axial reinforcement layer by way of external winders with storage spools. For applications that require additional hoop reinforcement, more than one hoop reinforcement layer can be incorporated into a cannular assembly. The more than one hoop reinforcement layers can be located adjacent or non-adjacent to each other. Preferably, a pair of hoop reinforcement layers located adjacent to each other will be wound with opposite handedness, e.g., one layer will be wound with a left-handed helix and the other layer will be wound with a right-handed helix.

One or more of the hoop reinforcement layers in a cannular assembly may incorporate a sensor wire disclosed below, including but not limited to a Pd- or Pd-alloy coated tapered optical fiber.

Sensor Array Layers

In some embodiments, the tubular composite structure further comprises one or more sensor array layers. These are functional layers embedded within the cannular assembly that can provide data acquisition capabilities for instantaneously reporting changes in, for example, temperature, pressure, flow, tension, fatigue, wall thickness, and/or corrosion, as well as other acoustic indicators such as movement like seismic events and approaching third-party activities. The embedded sensor array can provide continuous monitoring of the tubular composite structure for structural health.

Sensor Wires

The reinforcement materials in the tubular composite structure also may contain an embedded sensor wire for facilitating additional monitoring and interrogation capabilities of the cannular structure.

In some embodiments, the tubular composite structure contains at least one sensor wire. In some embodiments, the sensor wire is embedded in an axial reinforcement layer. In some embodiments, the sensor wire is embedded in a reinforcement layer that comprises micro-rope. In some embodiments, the sensor wire is embedded in concave valleys formed between micro-ropes.

Protective Layers

In a preferred embodiment, the tubular composite structure is enclosed in a protective layer. The protective layer is a functional layer applied on the exterior of the one or more hoop reinforcement layers to provide protection of the sensor array layer as well as all interior layers during the installation process. In one embodiment, this layer can be made of fiber reinforced high strength materials with high slip and abrasion resistant properties, including but not limited to nylon, tear-resistant PTFE coated fiberglass fabric, and polyethylene, depending on the application. The layer can be reinforced with aramid fabric, preferably para-aramid fabric. The layer can be impregnated with a high-slip coating. Inclusion of polyolefin or like compounds in a formulated composition can promote thermal shrinkage and compression of the protective layer during manufacture.

Alternatively, the protective layer may consist of an over-mold layer. The over-mold layer may consist of a material chosen from carbon fiber, Kevlar, aramid, preferably para-aramid, and fiberglass fabric. In some embodiments, the material may be impregnated with a UV or heat cured resin.

Mesh-Filled Annulus

In some embodiments, the tubular composite structure includes a layer composed of a flexible mesh material tape with compressive resistance and rigidity. An additional radial winder apparatus can be used for application of this layer. This mesh material is highly flexible longitudinally and is wound radially around the tubular composite structure during the onsite manufacturing process. This flexible mesh is applied immediately following the hoop reinforcement application and prior to the application of the protective layer. This compressively rigid mesh once applied affords a rigid substrate for the application of an over-mold protective layer as well as affording a mesh-filled annulus between the hoop reinforcement and the over-mold.

In a further embodiment, the mesh-filled annulus allows for the injection of a pressurized curable resin or non-curable liquid into the annulus. In a further embodiment, the liquid flows through the mesh to fill the annulus in its entirety after the cannular structure installation is completed. The injected resin or liquid can provide the end user with options that are dependent on the application location and the gas being stored.

Over-Mold

Methods disclosed herein can comprise application of an over-mold reinforcement layer during the manufacturing process. In some embodiments, incorporation of over-mold reinforcement layers can provide additional reinforcement without the need for assembling concentric multiple tubular composite structures. For example, these methods will be particularly useful for the coiled-tube structure, for which the tubular composite structure is manufactured with a predetermined minimum radius of curvature. Insertion of a second cannular assembly within a first, coiled cannular assembly, may be difficult or impossible, due to non-linear friction or capstan effect. For this reason, incorporation of an over-mold can provide the reinforcement that would otherwise be gained by providing a binary cannular assembly system.

In some embodiments, the over-mold comprises a bidirectional resin impregnated with any one of carbon fiber, Kevlar, fiberglass, UHMWPE, and graphene/diamine, or a combination of any or all, affording a filament tape suitable for winding. The liquid resin formulation utilized for the pre-impregnation and final curing/hardening of the over-mold material can be formulated with a titanium based white pigmentation for UV resistance.

Overview of Manufacturing Process

The process for manufacturing the cannular assembly can be understood by consideration of the accompanying drawings. It will be understood that many of the components depicted in the drawings are intended to be schematic in nature, and that incorporation of components having different visual appearance but serving the same purpose in the manufacturing process are intended to fall within the scope of the disclosure.

FIG. 1 depicts a schematic of a MOF that employs an individual spool for each axial applicator. The MOF will generally be equipped with an enclosure 5, which may be monolithic as shown, or which may comprise a number of segments, preferentially a segment for each manufacturing station. The cantilevered forming mandrel 10 is oriented left-to-right in the drawing, with supports 15 to the left of the MOF. In this orientation, "downstream" is to the right, and "upstream" is to the left. It will be appreciated that the mandrel will occupy the approximate center of the MOF, in order to provide clearance above and below the mandrel for the radius of the cannular assembly being manufactured, as well as for the associated machinery.

The cylindrical sealing layer 20 is formed from material 25; components for formation of this layer are omitted for clarity. Sealing layer 20 moves downstream, or left-to-right, and encounters the axial layer station. The sealing layer can be supplied with feedstock located upstream of the forming mandrel (not shown)

The embodiment depicted in FIG. 1 consists of two applicators, external to and oriented above and below the mandrel. Components of the applicators are omitted for clarity. The MOF may comprise additional applicators. The total number of applicators is without limitation; in one embodiment, two additional applicators exterior to and astride the mandrel can be envisaged. Each of the one or more applicators applies axial reinforcement material 35 as a ribbon that eventually is aligned in the longitudinal direction. The material 35 is dispensed from individual spools 40, with each applicator fitted with a dedicated spool.

The limitations of this design become apparent. The dimensions of the MOF may be constrained by external restrictions, including but not limited to those due to transportation. The maximum size of spools 40 above and below mandrel 10 may be less than ideal, due to, e.g., height restrictions. Reduction of the diameter of mandrel 10 is not an attractive option, since this would necessarily change the ID of the cannular assembly.

Also shown in FIG. 1 is a representation of the optional hoop reinforcement layer 50. A preferred embodiment will apply the material in a helical orientation, to obviate the need to fabricate or provide individual hoops of material that would be required for a perfectly circumferential application. Helical orientation of hoop reinforcement material 55 can be accomplished with winders that move in a circumferential direction. A single winder, equipped with spool 60 is depicted; components for formation of this layer are omitted for clarity.

The number of axial and hoop reinforcement stations is without limitation. The MOF may further contain fixtures for application of other components of the cannular assembly, including but limited to the aforementioned sensor array layers, protective layers, and mesh-filled annulus. The MOF may further contain one or more fixtures for spray application of material on either or both of the interior or exterior of the cannular assembly.

Figure 2:
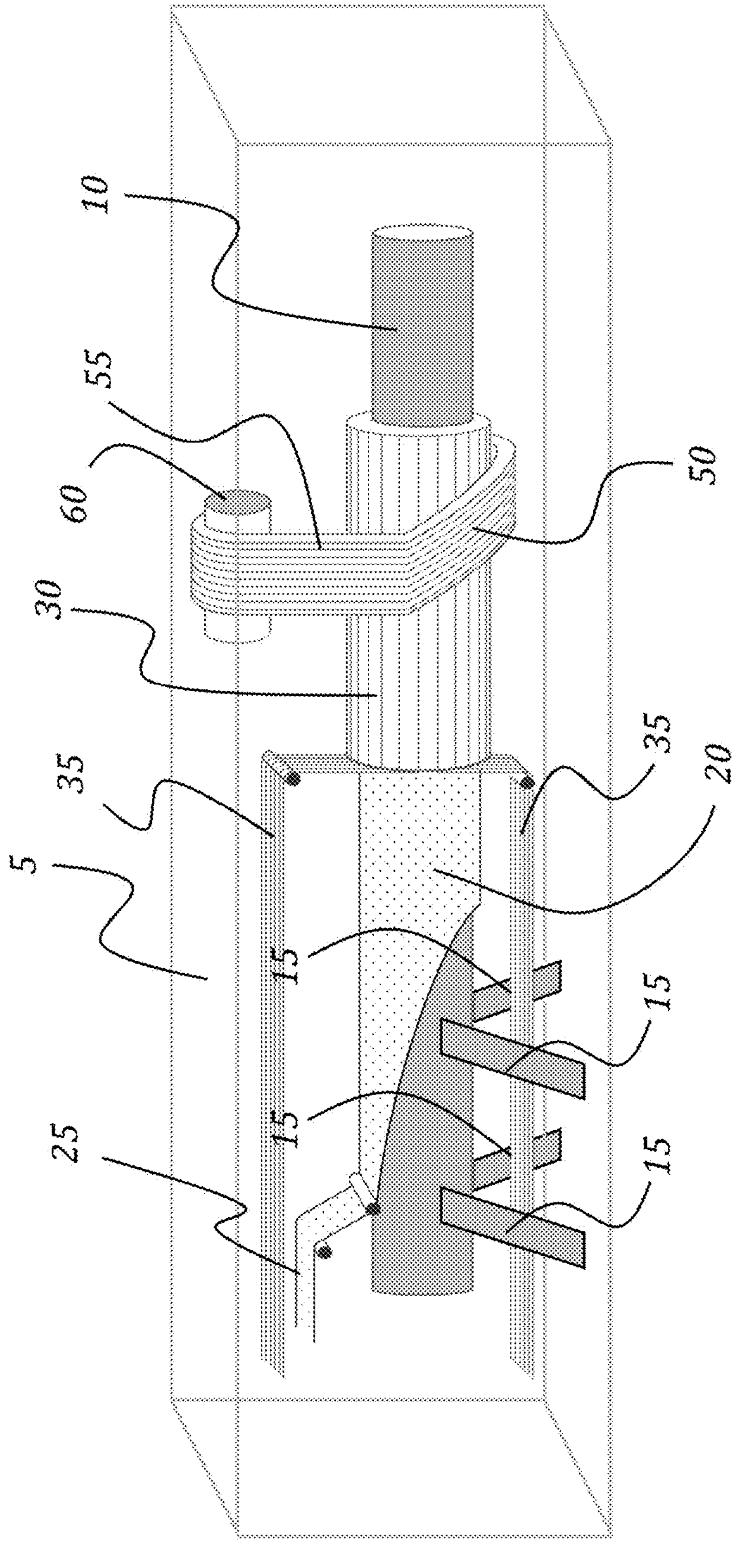
FIG. 2 depicts a schematic of a MOF that employs a source of axial reinforcement material located upstream of the applicators.

FIG. 2 depicts a schematic of a MOF that employs a single spool for all axial applicators. Enclosure 5 houses mandrel 10, cantilevered from supports 15. The cylindrical sealing layer 20 is formed from material 25; feedstock upstream from the mandrel is not shown.

Axial reinforcement layer 30 is fabricated from axial reinforcement material 35 by two applicators (not shown), external to and oriented above and below the mandrel. In this MOF, spools 40 are absent. Instead, material 35 is drawn from a source upstream of the mandrel (not shown). Feed from the source can be guided and controlled by suitable devices, such as rollers 45 indicated in FIG. 2. Fabrication of hoop reinforcement layer 50 from material 55 supplied from spool 60 is the same as for FIG. 1. Also depicted in FIG. 2 are optional second rollers 65, which are oriented to redirect the axial reinforcement material along the length of the surface of the nascent TCS.

The advantages of this design over the design of FIG. 1 become apparent on inspection. Supply of the material for the axial layer is upstream of mandrel 10. The volume that can be utilized for this supply is unencumbered by the presence of the mandrel. All else being equal, the size, and therefore capacity of spools 40 can be increased. Rather than the toroid of spools surrounding the mandrel, an upstream source of axial reinforcing material, consisting of one or more spools and feeding all of the axial applicators, can be utilized. Material from a single spool can be split into strips to feed the one or more applicators via rollers 45. This would be difficult or impossible using the FIG. 1 configuration: since the mandrel occupies the approximate center of the enclosure, a single spool cannot occupy any larger cross-sectional area than any of the plurality of spools shown in FIG. 1; otherwise, a protuberance in the enclosure would be required in the enclosure to accommodate the single large spool. Alternatively, a plurality of spools, preferentially with a spool dedicated to each of the one or more applicators, can be used.

The advantage of this design is readily apparent. The one or more spools, along with associated mounts and associated hardware for each, can be located in the area of the MOF upstream from the mandrel, free of encumbrance from the mandrel. Larger spools can be employed, enhancing operational uptime and decreasing service interruption, due to the less frequent spool exchanges for the higher capacity spools.

Figure 3:
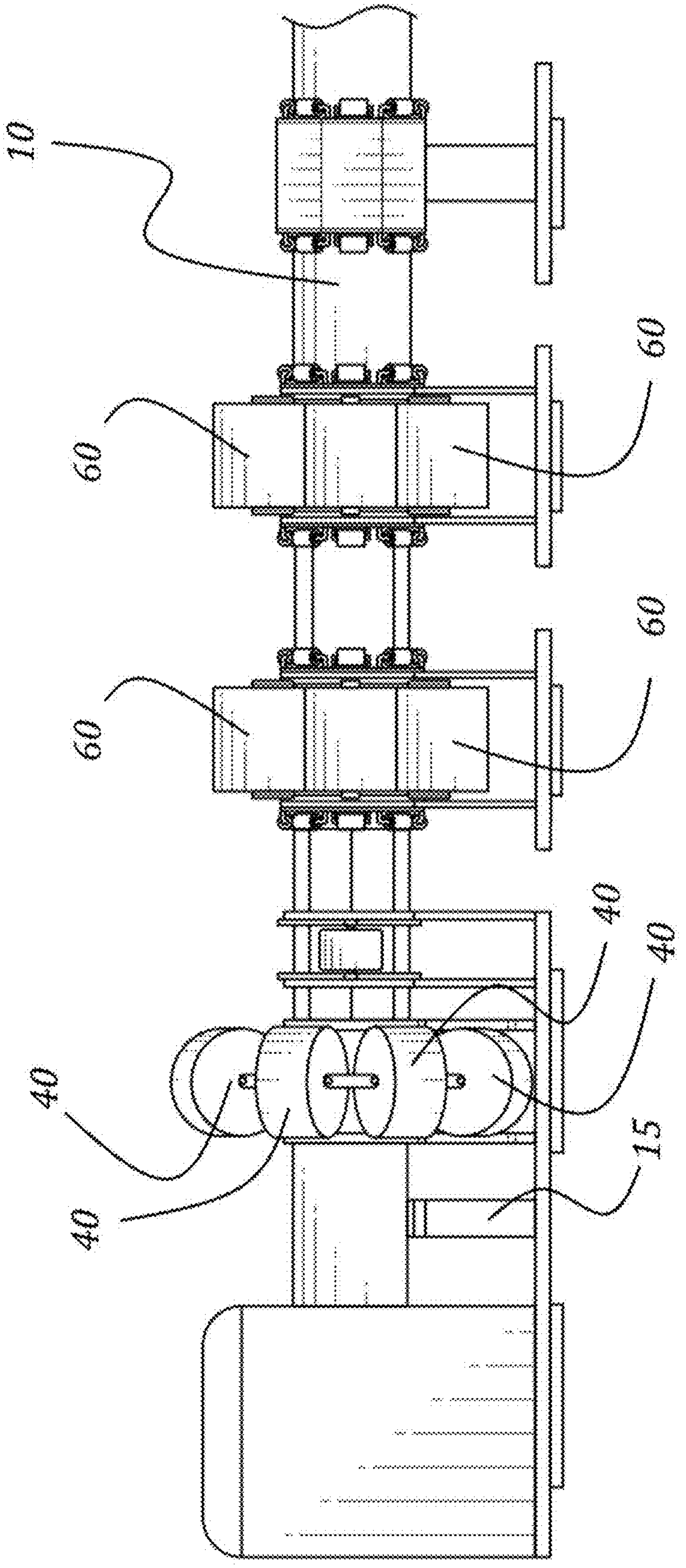
FIG. 3 depicts an exemplary embodiment of a MOF that employs a source of axial reinforcement material adjacent to the applicators.

FIG. 3 provides a more detailed rendition of a MOF similar to that depicted in FIG. 1. Enclosure 5 is not shown; mandrel 10 cantilevers from supports 15. Eight individual spools 40, spaced at 45° locations around the circumference of the mandrel, supply eight applicators (obscured) for the axial layer. The arrangement of the eight spools into a toroidal configuration will be apparent from this rendition. In some embodiments, spools 60 are provided in one or more banks of coplanar spools arranged around the perimeter of the mandrel 10. In some embodiments, each of the individual spools 60 is provided in one of the one or more banks. Two banks of individual spools 60 supply applicators (obscured) for the hoop layer.

An alternate configuration, not shown, would contain two banks of four axial applicators instead of a single bank of eight axial applicators. In each bank, the four axial applicators would be spaced at 90° locations around the circumference of the mandrel; the two banks would be staggered by 45° relative to each other. Use of multiple banks of applicators can increase the volume for each individual applicator in a bank, at the cost of a longer overall MOF.

Figure 4:
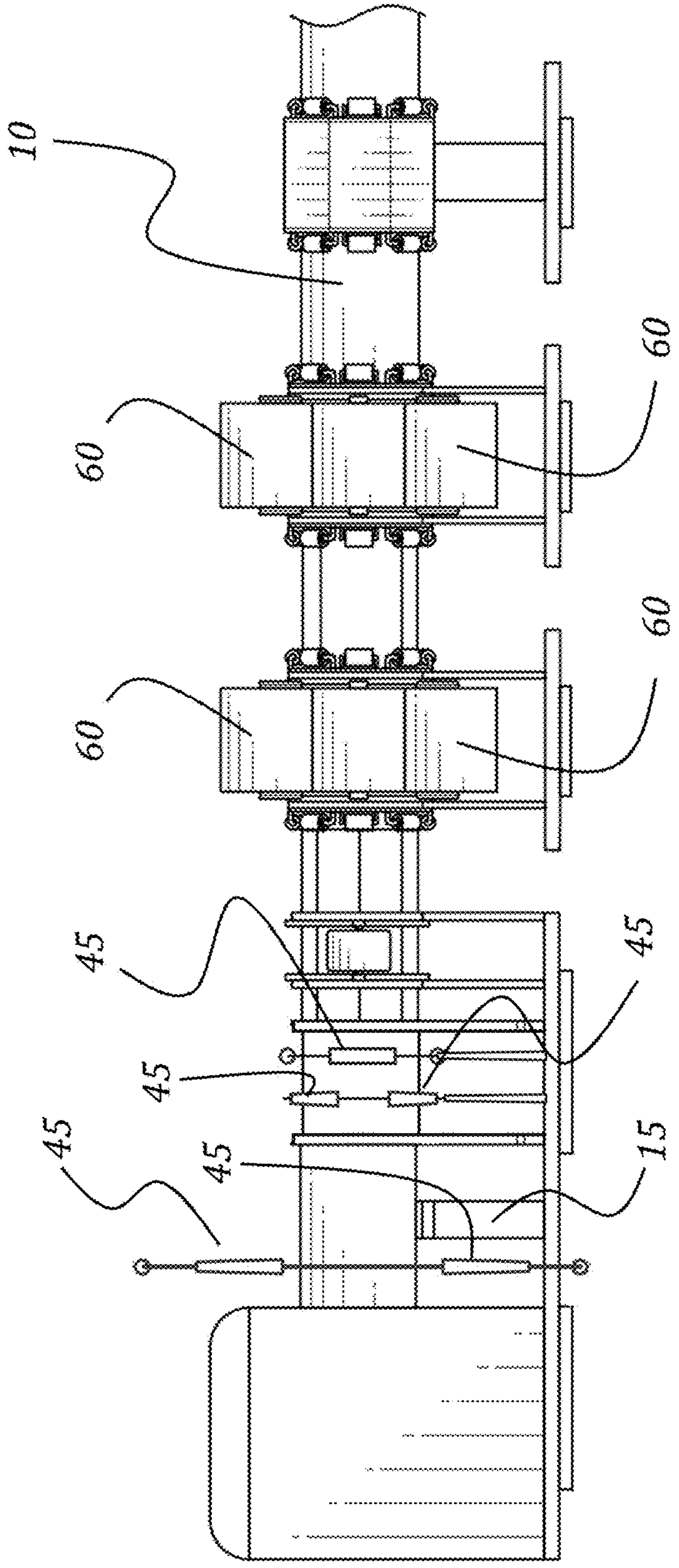
FIG. 4 depicts an exemplary embodiment of a MOF that employs a source of axial reinforcement material located upstream of the applicators.

FIG. 4 provides a more detailed rendition of a MOF similar to that depicted in FIG. 2. Enclosure 5 is not shown; mandrel 10 cantilevers from supports 15. Two banks, each containing four rollers 45, supply axial reinforcement material for eight applicators (not shown) for the axial layer. Two banks of individual spools 60 supply applicators (obscured) for the hoop layer.

The layout of the twin banks of axial applicators is apparent in FIG. 4. In each bank, rollers are spaced at 90° locations relative to each other, as evidenced by the top/bottom/front/back (obscured) rollers of the downstream bank. The staggering of the banks by 45° relative to each other can be seen by comparing the upstream and downstream rollers.

Figure 5:
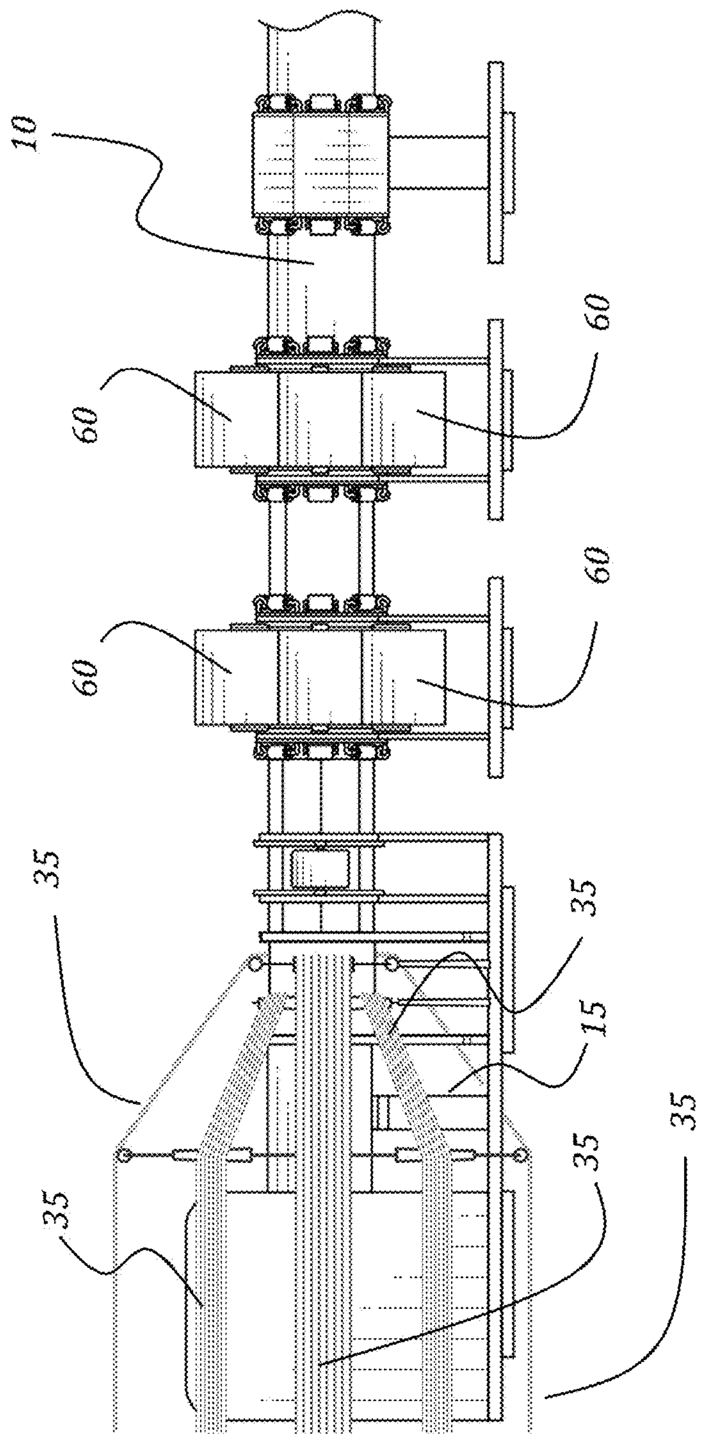
FIG. 5 depicts an exemplary embodiment of a MOF that employs a source of axial reinforcement material located upstream of the applicators, with axial material included.

FIG. 5 shows the MOF of FIG. 4 with axial reinforcement material 35 feeding the eight roller guides (obscured). Of the eight roller guides, 5 ribbons of reinforcement material are depicted, with the remaining 3 ribbons obscured in this view. Also depicted in FIG. 5 are optional second rollers 65, which are oriented to redirect the axial reinforcement material along the length of the surface of the nascent TCS.

Figure 6:
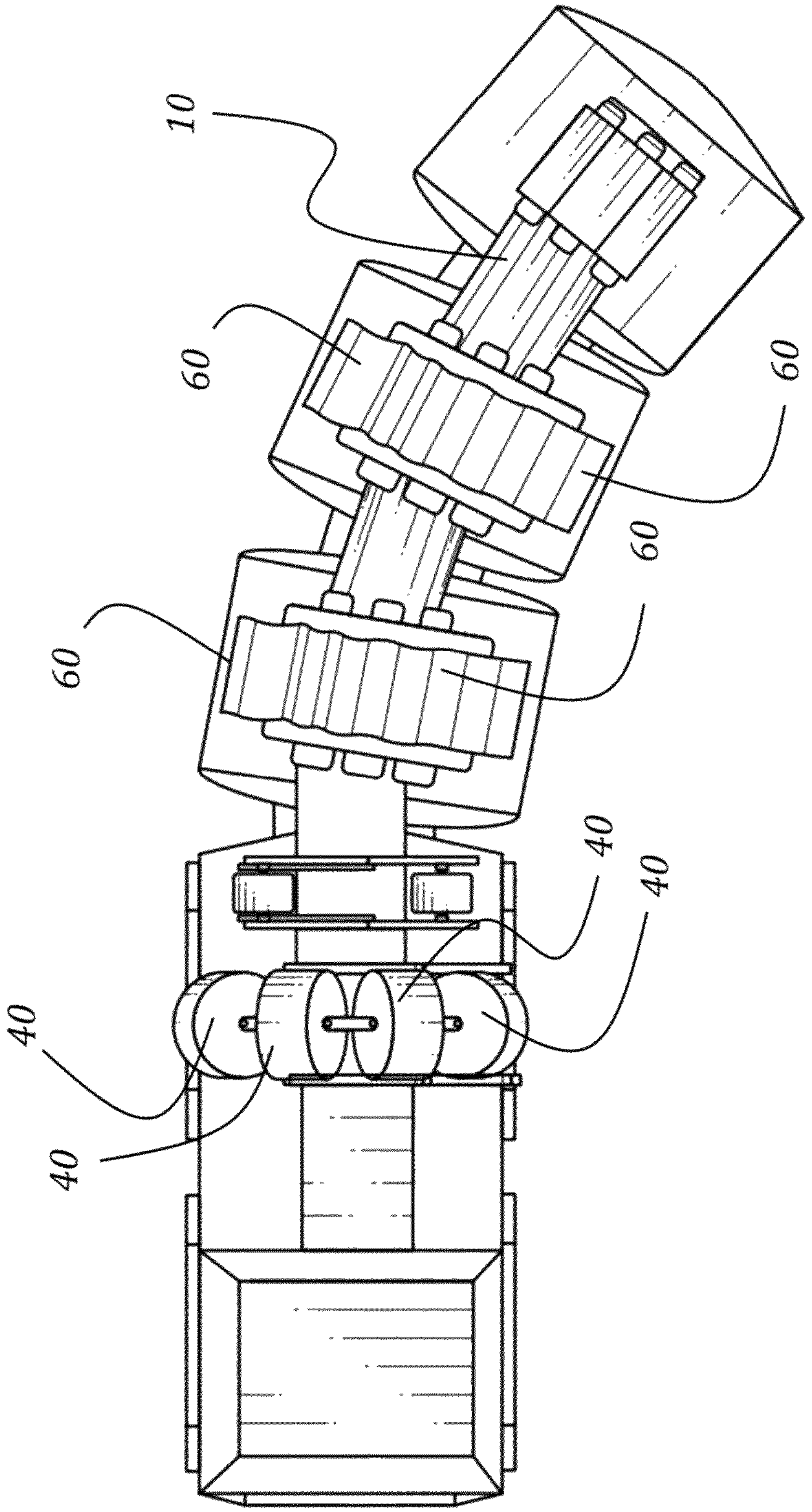
FIG. 6 depicts an exemplary embodiment of a MOF with a nonlinear mandrel that employs a source of axial reinforcement material located upstream of the applicators.

FIG. 6 depicts an alternative embodiment of a MOF with a nonlinear mandrel as viewed from above. An axial layer station for applying axial reinforcement material contains individual spools 40, with each of the one or more applicators fitted with a dedicated spool. Downstream from the axial station are two stations that contain individual spools 60 for applying hoop reinforcement material. The stations are configured with a nonzero yaw angle relative to each other, suitable for fabrication of a curved cannular assembly. Axial material will be consumed at a slower rate for manufacture of the inner surface of the cannular assembly than for the outer surface. This nonequal consumption, due to the unequal radii of curvature, is best accommodated by provisioning each individual applicator with a dedicated spool of material.

Figure 7:
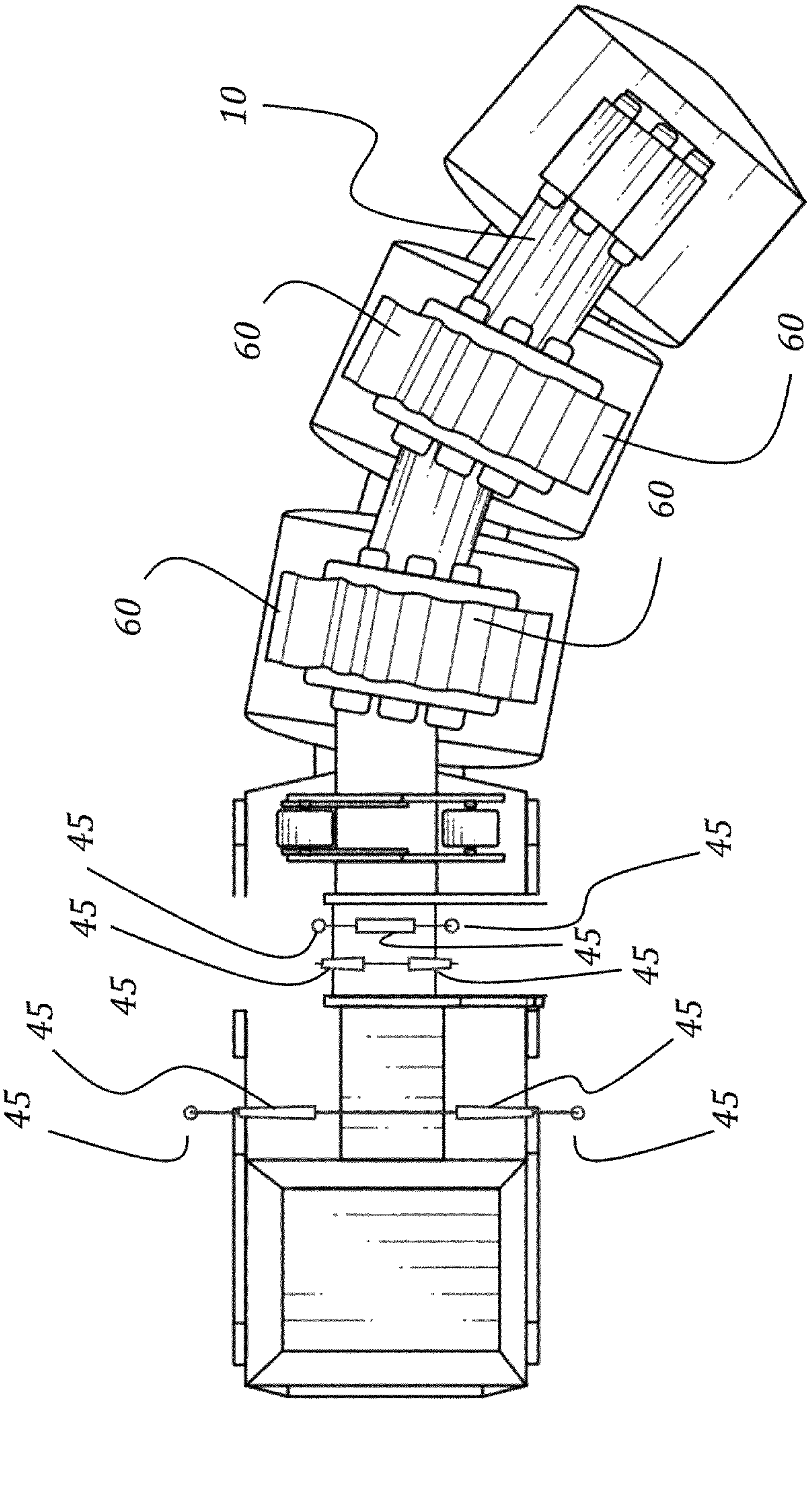
FIG. 7 depicts an exemplary embodiment of a MOF with a nonlinear mandrel that employs a source of axial reinforcement material located upstream of the applicators.

FIG. 7 depicts a modification of the MOF of FIG. 6, in which individual spools 40 are replaced with rollers 45, similar to the configuration presented in FIG. 4. In one embodiment, material for the applicators is provided from a single source, preferentially located upstream of the mandrel. In a preferred embodiment, individual spools for each of the one or more applicators are provided, preferentially located upstream of the mandrel. The individual spools can be arranged with collinear axes for compactness.

Figure 8:
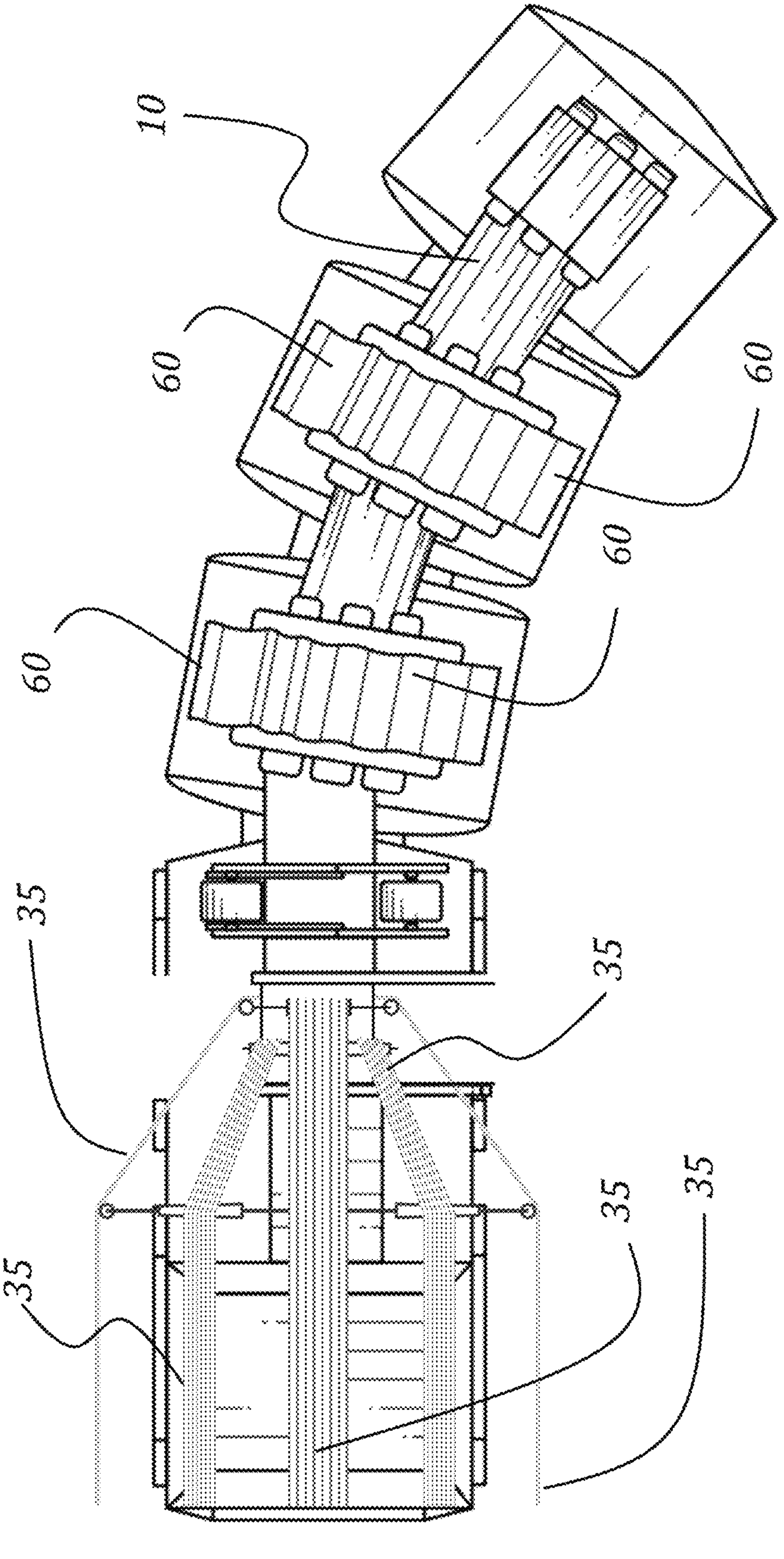
FIG. 8 depicts an exemplary embodiment of a MOF with a nonlinear mandrel that employs a source of axial reinforcement material located upstream of the applicators, with axial material included.

FIG. 8 depicts the MOF of FIG. 7, with axial material 35 included. First rollers 35 and second rollers 65 direct axial material 35 to a position alongside the surface of the nascent TCS.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. A mobile onsite factory ("MOF"), comprising:

a forming mandrel;

an axial layer station configured to apply axial reinforcement material on a cannular assembly, the axial layer station disposed along the forming mandrel and comprising one or more applicators;

one or more spools configured to provide axial reinforcement material to the one or more applicators; and one or more rollers disposed between the one or more spools and the axial layer station, the one or more rollers structurally configured to redirect axial reinforcement material from the one or more spools into an orientation substantially parallel to the forming mandrel, wherein at least one of the one or more spools is disposed at a different lateral position along the forming mandrel than the axial layer station, wherein the one or more spools are located upstream of a supported end of the forming mandrel.

2. The MOF of claim 1, wherein at least one of the one or more spools provides axial reinforcement material for a plurality of axial applicators.

3. The MOF of claim 2, further comprising:

a mechanism for laterally splitting axial reinforcement material from a spool of the axial reinforcement material.

4. The MOF of claim 1, wherein the one or more spools is a single spool that is located at a different lateral position along the MOF than the axial layer station.

5. The MOF of claim 1, wherein the one or more spools is a single spool that provides axial reinforcement for a plurality of applicators.

6. The MOF of claim 5, wherein the plurality of applicators encircles an entirety of the MOF.

7. The MOF of claim 1, wherein the one or more spools is a plurality of spools.

8. The MOF of claim 7, wherein the plurality of spools is located at a different lateral position along the forming mandrel than the axial layer station.

9. The MOF of claim 7, wherein axes of each spool of the plurality of spools are oriented perpendicular to an axis of the forming mandrel.

10. The MOF of claim 9, wherein axes of at least two spools of the plurality of spools are coplanar.

11. The MOF of claim 10, wherein an axis of each spool of the plurality of spools is coplanar with an axis of at least one other spool.

12. The MOF of claim 10, further comprising:

one or more banks of coplanar spools arranged around a perimeter of the forming mandrel.

13. The MOF of claim 12, wherein each spool of the plurality of spools is provided in the one or more banks of coplanar spools.

14. The MOF of claim 1, wherein the axial reinforcement material is at least one of para-aramid fiber, aramid fiber, unidirectional fiberglass, carbon fiber, or HDPE fabric.

15. The MOF of claim 14, wherein the axial reinforcement material is pre-impregnated with a further material comprising at least one of epoxy, polyurethane, polyolefin, and EVA.

16. The MOF of claim 15, wherein the axial reinforcement material comprises twisted or braided micro-ropes or twisted or braided carbon fiber graphene hybrid micro-ropes.

17. The MOF of claim 1, further comprising:

a station for application of a sealing layer.

18. The MOF of claim 17, wherein the sealing layer is made from a sealing material comprising at least one of ABS, PE, HDPE, UHMWPE, Nylon, PEEK, PET, PSS, PDA, PLA, PLLA, PPL, ETFE, polycarbonate, or polyurethane.

19. The MOF of claim 1, further comprising at least one station for application of a hoop reinforcement layer, the at least one station each comprising one or more applicators.

20. The MOF of claim 19, wherein the hoop reinforcement layer is made from a hoop reinforcement material comprising at least one of para-aramid fiber, aramid fiber, unidirectional fiberglass, carbon fiber, or HDPE fabric.

21. The MOF of claim 20, wherein the hoop reinforcement material is pre-impregnated with a further material comprising at least one of epoxy, polyurethane, polyolefinor EVA.

22. The MOF of claim 21, wherein the hoop reinforcement material comprises twisted or braided micro-ropes or twisted or braided carbon fiber graphene hybrid micro-ropes.

23. The MOF of claim 20, wherein the hoop reinforcement material further comprises a Pd-coated tapered optical fiber.

24. The MOF of claim 19, further comprising a station for application of a sensor array layer.

25. The MOF of claim 19, further comprising a station for forming of a mesh-filled annulus.

26. The MOF of claim 19, further comprising a station for forming a protective layer.

27. The MOF of claim 26, wherein the protective layer is an over-mold.

28. The MOF of claim 1, wherein the forming mandrel is non-linear.

29. The MOF of claim 1, wherein the axial reinforcement material is a single cylinder of material.

* * * * *